(12) United States Patent
Kobashi et al.

(10) Patent No.: US 6,830,724 B2
(45) Date of Patent: Dec. 14, 2004

(54) METHOD OF PRODUCING CERAMIC MATRIX COMPOSITE, AND CERAMIC MATRIX COMPOSITE PRODUCED BY THE METHOD FOR PRODUCTION

(75) Inventors: Makoto Kobashi, 25-2-304, Yagotofujimi, Showa-ku, Nagoya-city, Aichi-prefecture, 466-0812 (JP); Naoyuki Kanetake, 3-8, Hikari-town, Gifu-city, Gifu-prefecture, 502-0901 (JP); Takahiro Ishikawa, Toyoake (JP); Masahiro Kida, Aichi-prefecture (JP)

(73) Assignees: NGK Insulators, Ltd., Nagoya (JP); Makoto Kobashi, Nagoya (JP); Naoyuki Kanetake, Gifu (JP)

(*) Notice: Subject to any disclaimer, the term of this patent is extended or adjusted under 35 U.S.C. 154(b) by 100 days.

(21) Appl. No.: 10/219,505

(22) Filed: Aug. 15, 2002

(65) Prior Publication Data

US 2003/0059332 A1 Mar. 27, 2003

(30) Foreign Application Priority Data

Aug. 17, 2001 (JP) ........................................ 2001-248150
Aug. 13, 2002 (JP) ........................................ 2002-235938

(51) Int. Cl.$^7$ .............................. B22F 7/00; C04B 35/00
(52) U.S. Cl. ............................ 419/5; 419/66; 501/96.3; 501/98.6
(58) Field of Search ...................... 419/5, 66; 501/96.3, 501/98.6

(56) References Cited

U.S. PATENT DOCUMENTS

| 3,261,701 A | | 7/1966 | Grulke | |
|---|---|---|---|---|
| 5,093,148 A | * | 3/1992 | Christodoulou et al. | 427/37 |
| 6,214,284 B1 | * | 4/2001 | Soudarev et al. | 264/462 |

FOREIGN PATENT DOCUMENTS

| DE | 197 08 509 C1 | 9/1998 |
|---|---|---|
| JP | 05319936 | 12/1993 |
| JP | 8-508460 | 9/1996 |
| JP | 2609376 | 2/1997 |
| JP | 09209070 | 8/1997 |

OTHER PUBLICATIONS

Kobashi M et al: "Synthesis of boride and nitride ceramics in molten aluminium by reactive filtration," Journal of Materials Science, Chapman and Hall Ltd. London, GB, vol. 32, No. 23, Dec. 1, 1997, pp. 6283–6289, XP000726044, ISSN: 0022-2461.
Zhang G J et al: "Reactive Synthesis if AlN/TiB$_2$ Composite," Ceramics International, Elsevier Applied Science Publ, Barking, Essex, GB, vol. 22, No. 2, 1996, pp. 143–147, XP000551294, ISSN: 0272-8842.
Schneider S V et al: "Thermomechanical behaviour of TiB$_2$–AlN composites," 5$^{th}$ European Ceramic Conference, Euro Ceramics v. Extended Abstracts, Versailles, France, Jun. 22–26, 1997, vols. 132–136 (1997), pp. 524–527, XP008012186, Key Engineering Materials, 1997 Trans Tech Publications, Switzerland, ISSN: 1013–9826.
Database Inspec 'Online!, Institute of Electrical Engineers, Stevenage, GB; Qian D F et al: "The study of preparation of AlN powder," Database accession No. 4269518, XP002227052, abstract, & Proceedings of the 3$^{rd}$ International Conference on Properties and Applications of Dielectric Materials (Cat. No. 91CH2937–1), Tokyo, Japan, Jul. 8–12, 1991, pp. 669–671, vol. 2, 1991 New York, NY USA, IEEE, USA, ISBN: 0–87942–568–7.
Zdaniewski W: "Stereoscopic Fractography of Crack Propagation Phenomena in a TiB$_2$–AlN composite", Journal of the American Ceramic Society, Jan. 1989, USA, vol. 72, No. 1, pp. 116–121, XP002227051, ISSN: 0002–7820.
M. Kobashi and T. Choh, "Synthesis of Boride and Nitride Ceramics in Molten Aluminum by Reactive Infiltration," Journal of Materials Science 32 (1997), pp. 6283–6289.
H. Fujii et al., "Interfacial Reaction Wetting in the Boron Nitride/Molten Aluminum System" Acta Metall. Mater., (1993), vol. 41, No. 10, pp. 2963–2971.
G.J. Zhang and Z.Z. Jin, "Reactive Synthesis of AlN/TiB$_2$ Composite," Ceramics International, 22 (1996), pp. 143–147.
Wieslaw A. Zdaniewski, Stereoscopic Fractography of Crack Propagation Phenomena in a TiB$_2$–AlN Composite, J. Am. Ceram. Soc., 72[1], 1989, pp. 116–121.
J. Desmaison and M. Desmaison, "Boride/Nitride Composites: Synthesis and Properties," Materials Science of Carbides, Nitrides and Borides, 1999, pp. 267–284.
W.B. Cao, et al, "In–Situ Combustion Synthesis of TiB$_2$–AlN Composites," Key Engineering Materials, vols. 159–160 (1999), pp. 367–371.

\* cited by examiner

*Primary Examiner*—Ngoclan Mai
(74) *Attorney, Agent, or Firm*—Burr & Brown (57) ABSTRACT

A method of producing a ceramic matrix composite is provided, which production method reduces metal residual percentage within matrix with little energy consumption, without requiring special external heating means and special equipment while it is industrially simple and at a low price. It is a method of producing a ceramic matrix composite having the steps of filling mixed powder obtained by mixing metal powder and boron nitride powder into a predetermined container to form a green compact having a porous structure, and infiltrating the above described green compact with molten Al to form a composite material containing metal boride and having aluminum nitride as a matrix. The green compact is formed by compressing the mixed powder whose mixing ratio of metal powder to boron nitride powder is 1:1.8 to 1:2.2 (molar ratio) so that porosity of the green compact is 34 to 42%.

23 Claims, 5 Drawing Sheets

METHOD OF PRODUCING CERAMIC MATRIX COMPOSITE, AND CERAMIC MATRIX COMPOSITE PRODUCED BY THE METHOD FOR PRODUCTION

BACKGROUND OF THE INVENTION AND RELATED ART STATEMENT

The present invention relates to a method of producing a ceramic matrix composite requiring little energy consumption for production, and a ceramic matrix composite obtained by the method for production.

A composite material is a composition aggregate in which a plurality of raw-materials are macroscopically mixed to provide characteristics, which a raw material alone could not realize, by complementarily utilizing mechanical properties each raw material possesses. Basically, the method of producing a composite material is a technical method by which a material is combined with other material, and there are various combinations depending on matrixes and dispersed material (reinforcements etc.), intended purposes, or cost and the like.

Since ceramic matrix composite (referred to also as "CMC" hereinafter) and intermetallic matrix composite (referred to also as "IMC" hereinafter) among them have physical characteristics that a metal matrix composite (referred to also as "MMC" hereinafter) does not have, such as excellent heat resistance, utilization in various industrial fields has been intended.

Especially, aluminum nitride (AlN), a kind of ceramic, attracts attention taking advantage of characteristics, such as outstanding heat conduction characteristics and low coefficient of thermal expansion, as material for a high thermal conductivity substrate or a member for semiconductor manufacturing equipment. However, aluminum nitride may belong to a category demonstrating a low fracture toughness value among ceramic materials, and crack may occur under a service condition with loads, such as thermal shock, or when being combined with dissimilar materials, to impede the above described characteristics. For this reason, production of composite materials is investigated to improve fracture toughness value, etc. As a process of synthesizing a $TiB_2/AlN$ composite material that is a similar material to that in the present invention, G. J. Zhang et al. studied an increase in strength and improvement of physical properties of aluminum nitride, using Al, $TiH_2$, and BN powder and utilizing a reactive sintering method to induce a reaction between elements (Ceramics International, 22(1996), 143). However, in an in-situ CMC production process like this technique, synthesis under conditions of high pressure and high temperature is required as in conventional methods, and since near net shaping is also difficult, this process is accompanied with high cost. For this reason, a sintering process in which pressurized sintering is performed under a high temperature condition is needed as a general method for production of aluminum nitride and CMC utilizing this as a matrix.

And, for example, a method for production of intermetallic compound and ceramic is disclosed, in which raw material powder is mixed to produce a green compact, and then reaction is carried out by firing the green compact, in Japanese Patent No. 2609376 as specific related technology.

On the other hand, National Publication of International Patent Application No. 1996-508460 discloses, a method of producing a composite material by synthesis with firing under a low pressure of gaseous nitrogen using Al and boride or carbide of a transition metal as raw materials.

SUMMARY OF THE INVENTION

Generally, in a method for production of CMC which uses ceramic, such as aluminum nitride as matrix, in which pressurized sintering is carried out under a condition at a high temperature, special pressurizing devices and production instruments are required and there is a problem that manufacturing cost becomes high. Besides aluminum nitride as a raw material powder used for sintering has a necessity of being synthesized by techniques, such as reduction nitriding method and direct nitriding method, aluminum nitride sintered compact also shows difficulty in sintering, thus this technique becomes very complicated manufacturing process, and furthermore, sintering process at elevated temperature up to about no less than 1700° C. itself requires excessive energy consumption.

Among methods for production of the above described aluminum nitride raw material powder are a reduction nitriding method in which nitriding is performed by nitrogen gas or ammonia gas while $Al_2O_3$ powder having high grade is reduced with carbon, and a direct nitriding method in which aluminum powder is nitrided by nitrogen gas or ammonia gas. However, in the reduction nitriding method, since reaction itself is an endothermic reaction while there is an advantage of being able to obtain high grade aluminum nitride powder, a process requiring a large amount of energy is needed. And while the direct nitriding method is economical process using exothermic reaction, since grain size obtained by synthesis is coarse, further pulverizing process is needed. When sintering process is regarded as a material production process, even if only process for synthesizing raw material powder is taken into consideration, it may probably be regarded as a process with extraordinary high energy consumption. Besides, since external energy by heating with heater is utilized to heat a furnace atmosphere, maintaining of an elevated temperature in case of sintering ceramic shows an inferior thermal efficiency, and therefore it is a process with a very large energy loss.

And, according to a method for production shown in Japanese Patent No. 2609376 official report, in order to a manufacture composite material that has a densified fine structure there is a necessity to completely melt a formed matrix. Therefore, restrictions arise in performance and scale of manufacturing apparatus, and there is a problem that production of a composite material that is large-sized or has a complicated form is very difficult, and it is difficult to perform near net shaping in view of a form of a final product simultaneously. From this point of view, a case may be assumed in which increase in processing cost in next process may be caused when it is taken into consideration that the ceramic and the composite material itself are material having a difficult workability.

Furthermore, in the method for production shown in National Publication of International Patent Application No. 1996-508460 official report, in order to reduce an amount of Al remained unavoidably, there is a necessity that the reaction is fully progressed. However, since strict control of material composition ratio, reaction conditions, etc. were required for completion of the reaction, it was difficult technically and in manufacturing cost to reduce Al residual percentage.

The present invention has been done in view of these problems associated with conventional arts and aims at a method of producing a ceramic matrix composite produced by a method, which production method reduces metal residual percentage within matrix by little energy consumption, without requiring special external heating means and special equipment while it is industrially simple and at a low price, and a ceramic matrix composite obtained by this method for production having a high strength and low thermal expansion characteristic.

That is, according to the present invention, a method of producing a ceramic matrix composite shown below and a ceramic matrix composite produced by the method for production are provided.

(1) A method of producing a ceramic matrix composite comprising the steps of: filling mixed powder obtained by mixing metal powder and boron nitride powder into a predetermined container to form a green compact having a porous structure; and infiltrating the green compact with molten Al to form a composite material containing metal boride and having aluminum nitride as a matrix, wherein the green compact is formed by compressing the mixed powder whose mixing ratio of the metal powder to the boron nitride powder is 1:1.8 to 1:2.2 (molar ratio) so that porosity of the green compact is 34 to 42%.

(2) A method of producing a ceramic matrix composite comprising the steps of: filling mixed powder obtained by mixing metal powder and boron nitride powder into a predetermined container to form a green compact having a porous structure; and infiltrating the green compact with molten Al to form a composite material containing metal boride and having aluminum nitride as a matrix, wherein the green compact is formed by compressing the mixed powder whose mixing ratio of the metal powder to the boron nitride powder is 1:2.2 to 1:4.0 (molar ratio) so that porosity of the green compact is 26 to 40%.

(3) A method of producing a ceramic matrix composite comprising the steps of: filling mixed powder obtained by mixing metal powder and boron nitride powder into a predetermined container to form a green compact having a porous structure; and infiltrating the green compact with molten Al to form a composite material containing metal boride and having aluminum nitride as a matrix, wherein the green compact is formed by compressing the mixed powder whose mixing ratio of the metal powder to the boron nitride powder is 1:1.8 to 1:2.2 (molar ratio) is compressed so that porosity of the green compact is 15 to 34%.

(4) A method of producing a ceramic matrix composite comprising the steps of: filling mixed powder obtained by mixing metal powder and boron nitride powder into a predetermined container to form a green compact having a porous structure; and infiltrating the green compact with molten Al to form a composite material containing metal boride and having aluminum nitride as a matrix, wherein the green compact is formed by compressing the mixed powder whose mixing ratio of the metal powder to the boron nitride powder is 1:2.2 to 1:4.0 (molar ratio) is compressed to form the green compact so that porosity of the green compact is 15 to 26%.

In the method of producing a ceramic matrix composite according to the present invention, the mixed powder may further contain aluminum nitride particles in a ratio of not more than 1 mole to 1 mole of the metal powder in addition to the metal powder and the boron nitride powder.

It is preferable to use boron nitride powder having a mean particle diameter of not more than 20 $\mu$m.

It is also preferable to maintain the green compact at 1000 to 1400° C. for no less than 10 minutes after infiltration with molten Al.

It is preferred to use further at least one kind of the metal powder selected from the group consisting of Ti, Ta, Hf, Nb, and Zr.

In the present invention, the infiltration with molten Al is preferably carried out under inert gas atmosphere.

A molten Al may preferably contain not more than 3% by mass of Mg.

There is further provided a ceramic matrix composite produced by the method of producing a ceramic matrix composite according to the present invention, which comprises metal boride, and a matrix having as a principal component aluminum nitride whose Al content is not more than 20% by volume.

It is preferred that the Al content in aluminum nitride is not more than 10% by volume.

There is still further provided a ceramic matrix composite produced by the method of producing a ceramic matrix composite according to the present invention, which comprises metal boride, boron nitride, and a matrix having as a principal component aluminum nitride whose Al content is not more than 20% by volume.

In this case, it is preferable that the Al content in aluminum nitride is not more than 10% by volume. Further, it is preferable that the ceramic matrix composite has a thermal expansion coefficient of 10 ppm/K or less.

BRIEF DESCRIPTION OF THE DRAWINGS

The file of this patent contains at least one drawing executed in color. Copies of this patent with color drawing (s) will be provided by the Patent and Trademark Office upon request and payment of the necessary fee.

FIGS. 4(a)(b)(c) are color photographs in which an element mapping by EPMA of a composite material produced in Example 2 shows a half tone image currently displayed on a display and FIG. 4(a) is a non-processed photograph.

FIGS. 5(a)(b)(c) are color photographs in which an element mapping by EPMA of a composite material produced in Example 2 shows a half tone image currently displayed on a display and FIG. 5(a) is a photbgraph showing distribution of oxygen (O), and FIG. 5(b) of aluminum (Al), and FIG. 5(c) of tantalum (Ta).

DETAILED DESCRIPTION OF PREFERRED EMBODIMENTS

In the following, embodiments of the present invention will be described in detail, but the present invention should not be limited to these embodiments, and it should be understood that suitable modifications and improvement in design may be added based on usual knowledge of those skilled in the art without departing from the true spirit and scope of the present invention.

A first embodiment of the present invention is a method of producing a ceramic matrix composite comprising the steps of filling mixed powder obtained by mixing metal powder and boron nitride powder into a predetermined container to form a green compact having a porous structure, and infiltrating the green compact with molten Al to form a composite material (CMC) containing metal boride and having aluminum nitride as matrix, wherein non-pressurized infiltration phenomenon of Al is allowed to occur utilizing excellent wettability between the boron nitride and the molten Al which appears especially at no less than about 1000° C., and then displacement reaction of Al to aluminum nitride is induced by an in-situ synthesis by a self-combustion reaction between elements to produce a target CMC. Under present circumstances, especially stable free energy of formation of boride is utilized as a driving force for in-situ synthesis energy, and solid boron nitride powder is used as a source of supply of in-situ nitriding of the molten Al to promote the reaction. For this reason, processes performed beforehand, such as synthesis of the aluminum nitride powder excellent in degree of sintering, addition and mixing of sintering auxiliary agent, elimination of contamination (impurity), molding, and sintering, are not required, and thus since processes from aluminum nitride powder synthesis to matrix formation are performed simultaneously by this in-situ nitriding reaction, a method for production of CMC becomes possible in which manufacturing process and manufacturing cost are significantly reduced.

And, since displacement reaction from Al to aluminum nitride is promoted using heat of reaction of self-combustion generated by reaction between molten Al and each element powder, production of CMC is possible at a low temperature condition as compared with an aluminum nitride sintered compact that usually required sintering at an elevated temperature of about no less than 1700° C. Furthermore, production of CMC by non-pressurized penetration is possible without using higher pressure as in HP or HIP, conventional methods for production. Therefore, molten Al having flowability is infiltrated into a mold which simulates a product form, and thereby, synthesis of large-sized ceramic that was difficult to be produced with reference to performance of manufacturing apparatus was difficult, or production of CMC with significantly reduced processing cost and having complicated form simulating a final product form becomes possible.

In this way, this embodiment is a low energy consumption type process utilizing autonomous internal energy between elements, in contrast to a conventional sintering process that was a high energy consumption type process mainly utilizing external energy.

Furthermore, in a first embodiment of the present invention, reinforced material is formed by in-situ synthesis in contrast to there having been problems very much in an interface structure control because dissimilar material is changed into composite material by external energy added in conventional composite materials. Therefore, there is advantage that outstandingly excellent interfacial bonding between particle/matrix, outstanding chemical stability at elevated temperature, and very uniform fine dispersion within matrix are realized. In addition, in a first embodiment of the present invention, a method of producing a ceramic matrix composite having ceramic as matrix is provided, in which Al as raw material is efficiently consumed and residual Al percentage in the matrix is reduced using a green compact having a mixing ratio of metal powder and boron nitride powder contained in mixed powder and porosity being set within a range of a predetermined numerical value. Hereafter, description will be give in detail.

A green compact used for a method for production of CMC concerning the first embodiment of the present invention is a green compact having a porous structure and formed by filling mixed powder obtained by mixing metal powder and boron nitride powder into a predetermined container, which is the infiltrated with molten Al that is Al at an elevated temperature in molten state. The first embodiment of the present invention is a method for production in which a green compact is formed by compressing mixed powder whose mixing ratio of metal powder to boron nitride powder is 1:1.8 to 1:2.2 (molar ratio) so that porosity of the green compact is 30 to 42%, then the green compact is infiltrated with molten Al, and Al residual percentage in a matrix of CMC obtained may be set lower, more practically not more than 20% by volume.

Since a green compact used in the first embodiment of the present invention has a porous structure, molten Al is infiltrated into voids spreading in a shape of network in the whole green compact. By metal powder, boron nitride powder, and Al which are contained in the green compact, in-situ reaction as shown in following equation (1) occurs, and CMC having a densified fine structure is obtained. Here, "compress" in the present invention means an operation of applying moderate pressure to mixed powder filled up into a suitable container, and obtaining a green compact in the state where porosity is arbitrarily changed. Therefore, in the present invention, porosity is adjusted to a moderate value by adjusting pressure applied, and then molten Al is infiltrated into the formed void to induce a displacement reaction of Al to aluminum nitride.

[Formula 1]

$$Me+2BN+2Al \rightarrow 2AlN+MeB_2 \qquad (1)$$

(where, Me is metal powder)

In addition, when it is assumed that the above described equation (1) completely advances, for example, if Ti and Ta are used as Me element, theoretically synthesis of a composite material of TiB₂ (38% by volume)/AlN and TaB₂ (42%. by volume)/AlN will become possible.

In a first embodiment of the present invention since in-situ reaction occurs by infiltration of molten Al, a process of sintering under conditions at elevated temperature and high pressure is not necessary, which was required in conventional methods for production of CMC having ceramic as matrix. Therefore, since special means and special equipment for heating from outside are unnecessary, this method is an industrially simple method for production of CMC with reduced manufacturing cost. Furthermore, large-sized members or members with complicated form may also be easily produced.

And, as shown in the above described equation (1), reaction among each raw material of metal powder, boron nitride powder, and Al is stoichiometrically performed in a molar ratio of 1:2:2, and thereby remaining of raw materials may be avoided in the matrix. That is, according to the first embodiment of the present invention, porosity of the green compact may be controlled within a range of the above described numerical value, and thereby a CMC may be produced in which residue of raw materials, especially Al, is avoided as much as possible and a residual percentage of Al is low in the matrix. In addition, in the first embodiment of the present invention, a mixing ratio of metal powder and boron nitride powder contained in mixed powder is preferably 1:1.9 to 1:2.1 (molar ratio), and more preferably 1:1.95 to 1:2.05 (molar ratio).

The optimal porosity (theoretical value) in order that Al is completely consumed by the reaction is calculable as follows. Namely, porosity should just be calculated in which a molar ratio of each raw material, when molten Al fills voids formed with metal powder and boron nitride powder, gives an optimum value. Here, when atomic weights of the metal powder, the boron nitride powder, and the Al are defined as $W_{Me}$, $W_{BN}$, and $W_{Al}$, respectively, and density is defined as $\rho_{Me}$, $\rho_{BN}$, and $\rho_{Al}$, respectively, an optimal porosity (%) is calculated by an equation represented by a following equation (1). However, a following optimal porosity is an ideal optimum value at room temperature for reference's sake, practically, expansion by heating etc. of various raw material powders at infiltration temperature needs to be taken into consideration, and therefore, an optimal porosity may be varied a little from a value obtained by the following equation.

$$\text{Optimal porosity (\%)} = \frac{2\frac{W_{Al}}{\rho_{Al}}}{\frac{W_{Me}}{\rho_{Me}} + 2\frac{W_{BN}}{\rho_{BN}} + 2\frac{W_{Al}}{\rho_{Al}}} \times 100 \quad \text{[Equation 1]}$$

In addition, when optimal porositys in the above described equation (1) are calculated according to the above described equation, 38.0% in the case where Me is Ti, and 37.8% in the case where is Ta will be given. And, in the first embodiment of the present invention, in order to reduce further Al residual percentage in the matrix of the CMC obtained, it is preferable that it is compacted so that porosity of the green compact may give 36 to 42%, and it is still more preferable that it is compacted so that 37 to 40% may be given. When exceeding 42%, it is not preferable that there is case where Al remains to cause a possibility of faults, such as decrease in heat-resistance.

In addition, in Al residual percentage, if Al residual percentage in the matrix is not more than 20% by volume, influence on physical characteristics as a CMC, such as thermal expansion characteristics will be in an ignorable level, and it is still more preferable if it is not more than 10% by volume. Here, a matrix represents a phase consisting of aluminum nitride, and Al unavoidably remained, and is a concept in contrast to a dispersed material consisting of both formed boride and remaining boron nitride. And, in the first embodiment of present invention, although a minimum value of Al residual percentage in the matrix is not especially limited, it is set as no less than 2% by volume, and probably it is difficult to set a residual percentage of Al in the matrix substantially at 0. However, in a usage where heat resistance is not required as a CMC after synthesized the above described Al phase remained in the matrix serves as fracture resistance in case of crack propagation for low fracture toughness characteristics of the above described aluminum nitride, which effectively contributes as a factor increasing the fracture toughness value. For this reason, crack initiation problem in aluminum nitride that was conventional problem may be reduced, and it becomes possible to obtain a CMC having excellent heat cycle resistant characteristics.

Next, description for a second embodiment of the present invention will be given. A second embodiment of the present invention is a method for production of a CMC comprising the steps of filling mixed powder obtained by mixing metal powder and boron nitride powder into a predetermined container to form a green compact having a porous structure, and infiltrating the above described green compact with molten Molten Al to form a composite material containing metal boride and having aluminum nitride as matrix, wherein the green compact is formed by compressing the mixed powder whose mixing ratio of the metal powder to the boron nitride powder is 1:2.2 to 1:4.0 (molar ratio) so that porosity of the green compact may become 23 to 40%, and Al residual percentage in the matrix is reduced. Hereinafter, description in detail will be given.

In the second embodiment of the present invention, a mixing ratio of the metal powder and the boron nitride powder contained in the mixed powder forming a green compact is set as 1:2.2 to 1:4.0 (molar ratio). Namely, in the case where a stoichiometric ratio by the above described equation (1) is considered as basis, as is shown in a following equation (2), a CMC in which Al residual percentage within the matrix is further reduced may be produced by setting an amount of boron nitride powder excessive (x moles) as compared with metal powder. As shown in the following equation (2), specifically, x mole of boron nitride which is excessive remains in the matrix.

[Formula 2]

$$Me+(2+x)\ BN+2Al \rightarrow 2AlN+MeB_2+xBN \quad (2)$$

(where, Me is metal powder.)

Since special means and special equipment for heating from outside are unnecessary, the second embodiment of the present invention is an industrially simple method for production of CMC with reduced manufacturing cost. Furthermore, large-sized members or members with complicated form may also be easily produced. In addition, a CMC may be produced in which, while reduction of Al residual percentage is possible, $MeB_2$ and boron nitride are dispersed in an aluminum nitride matrix obtained, and outstanding self-lubricating ability and outstanding workability as characteristics of boron nitride are demonstrated by making boron nitride remained. Furthermore, it is preferable that a mixing ratio of metal powder and boron nitride powder contained in the mixed powder is 1:2.5 to 1:3.8 (molar ratio), and it is still more preferable that it is 1:2.8 to 1:3.5 (molar ratio).

And, in the second embodiment of present invention, molten Al is infiltrated to a green compact having 26 to 40% of porosity. When porosity exceeds 40%, it is not preferable that Al may remain. Furthermore, in order to further reduce Al residual percentage in the matrix of the CMC obtained, it is preferable to set porosity of the green compact as 27 to 38%, and it is more preferable as set to 28 to 38%.

Next, description for a third embodiment of the present invention will be given. A third embodiment of the present invention is a method for production of a CMC forming a composite material containing metal boride and having aluminum nitride as matrix by filling mixed powder obtained by mixing metal powder and boron nitride powder into a predetermined container, by forming a green compact having a porous structure, and then by infiltrating molten Molten Al to the above described green compact, wherein the mixed powder whose mixing ratio of the metal powder to the boron nitride powder is 1:1.8 to 1:2.2 (molar ratio) is compressed to form the green compact so that porosity of the green compact may become 15 to 34%, molten Al is infiltrated to the green compact and thus Al residual percentage in the matrix is reduced. Hereinafter, description in detail will be given.

In the third embodiment of the present invention, a mixing ratio of metal powder and boron nitride powder contained in the mixed powder forming a green compact is set as 1:1.8 to 1:2.2 (molar ratio). An Al residual percentage in the matrix of the CMC obtained may be set lower, more practically not more than 20% by volume by infiltrating molten Al to the green compact formed from the mixed powder. And, a mechanism of a reaction given by making molten Al infiltrated is the same as that in the first embodiment. Therefore, since special external heating means and special equipment are unnecessary, while it is an industrially simple method for production of CMC with reduced manufacturing cost. Furthermore, large-sized members or members with complicated form may also be easily produced.

Furthermore, in the third embodiment of present invention in order to further reduce an Al residual percentage in the matrix of the CMC obtained, a mixing ratio of metal powder and boron nitride powder contained in mixed powder is preferably 1:1.9 to 1:2.1 (molar ratio), and more preferably 1:1.95to 1 :2.05 (molar ratio). And, mixed powder is preferably compacted so that porosity of a green compact may give 18 to 28%, and more preferably so that 20 to 25% may be given.

Next, description for a fourth embodiment of the present invention will be given. A fourth embodiment of the present invention is a method for production of a CMC forming a composite material containing metal boride and having aluminum nitride as matrix by filling mixed powder obtained by mixing metal powder and boron nitride powder into a predetermined container, by forming a green compact having a porous structure, and then by infiltrating molten Molten Al to the above described green compact, wherein the mixed powder whose mixing ratio of the metal powder to the boron nitride powder is 1:2.2 to 1:4.0 (molar ratio) is compressed to form the green compact so that porosity of the green compact may become 15 to 26%, and thus Al residual percentage in the matrix is reduced. Hereinafter, description in detail will be given.

In the fourth embodiment of the present invention, a mixing ratio of metal powder and boron nitride powder contained in mixed powder forming a green compact is set as 1:2.2 to 1:4.0 (molar ratio). Namely, in the case where a stoichiometric ratio by the above described equation (1) is considered as basis, as is shown in a following equation (2), a CMC in which Al residual percentage within the matrix is further reduced may be produced by setting an amount of boron nitride powder excessive (x moles) as compared with metal powder. Specifically, x mole of boron nitride that is excessive remains in the matrix. And, a mechanism of a reaction given by making molten Al infiltrated is the same as that in the second embodiment. Therefore, since special external heating means and special equipment are unnecessary, while it is an industrially simple method for production of CMC with reduced manufacturing cost. Furthermore, large-sized members or members with complicated form may also be easily produced. In addition, a CMC may be produced in which, while reduction of Al residual percentage is possible, $MeB_2$ and boron nitride are dispersed in an aluminum nitride matrix obtained, and outstanding self-lubricating ability and outstanding workability as characteristics of boron nitride are demonstrated by making boron nitride remained. Furthermore, it is preferable that a mixing ratio of metal powder and boron nitride powder contained in the mixed powder is 1:2.5 to 1:3.8 (molar ratio), and it is still more preferable that it is 1:2.8 to 1:3.5 (molar ratio).

And, in the fourth embodiment of the present invention, molten Al is infiltrated to a green compact having 15 to 26% of porosity. When porosity exceeds 26%, it is not preferable that Al may remain. Furthermore, in order to further reduce Al residual percentage in the matrix of the CMC obtained, it is preferable to set porosity of the green compact as 17 to 24%, and it is more preferable as 18 to 23%.

Next, further detail of a method for production of CMC of the present invention will be described. In the present invention, it is preferable to use at least one kind of metal powder selected from a group consisting of Ti, Ta, Hf, Nb, and Zr. As is shown in the above described equation (1), these metal powders use free energy of formation of stable boride as a driving force, and promote an in-situ nitriding reaction of matrix. And by adjusting an amount to be used, intermetallic compound is formed and, also preferably, these metal powders may effectively control residue of Al inside of the matrix. Furthermore, also preferably these metal powders are easily available, and cheap.

Furthermore, in the present invention, after infiltration with molten Al, reaction system is preferably maintained for no less than 10 minutes at 1000 to 1400° C. This enables further progression of an in-situ reaction occurred by infiltration of Al, and further suppression of residual percentage of Al. Furthermore, although an upper limit of the above described maintained time is not especially limited, if progressing degree, energy cost, etc. of the reaction are taken into consideration, it is enough to be one to approximately several hours.

Since the above described maintained temperature and time in the present invention are lower and shorter as compared with maintained temperature and time by which CMC is produced by sintering, special external heating means or special equipment are not required, and so the method is an industrially simple method for production.

Next, further description in detail will be given with reference to an embodiment of a method for production according to the present invention. First, metal powder having a mean particle diameter of not more than 44 $\mu$m, and boron nitride powder having a mean particle diameter of not more than 20 $\mu$m are mixed so that it may give a predetermined molar ratio to prepare mixed powder. Here, a mean particle diameter of the boron nitride powder is more preferably to give no less than 10 $\mu$m and still more preferably no less than 5 $\mu$m. Furthermore, in the present invention, although a minimum value of a mean particle diameter of the boron nitride powder is not especially limited, it is necessarily just to be no less than 0.5 $\mu$m in the light of availability and easy handling. That is, a nitriding start point of an in-situ nitriding reaction of the reaction is dependent on boron nitride powder, and acts as a supply source of nitriding reaction of matrix, and therefore it is effective that a number of nuclei used as nitriding point is increased by being fined of boron nitride powder in order to improve rate of nitriding. In either of raw materials, when a mean particle diameter exceeds the above described numerical value, completion of reaction may become unpreferably difficult in the subsequent in-situ reaction. And, in order to improve dispersibility of powder when mixed organic solvent may be added. Furthermore, the above described solvent may be any solvent, as long as it does not react with the metal powder nor the boron nitride powder and is removable by degreasing later.

And, in the present invention, it is preferable that the mixed powder further includes aluminum nitride particle by a ratio of not more than 1 mole to one mole of the metal powder in addition to the metal powder and the boron nitride powder. That is, the aluminum nitride particle plays a role of promoting the in-situ nitriding reaction as so-called nucleus, and Al residual percentage in the matrix constituting CMC may be reduced. And, in this reaction, since a matrix range portion that is "in-situ nitrided" is decreased, it contributes to improvement in rate of nitriding.

Further, in the case of the above described equation (3), while a volume ratio of aluminum nitride contained in a CMC obtained is determined according to a kind of metal powder used, the volume ratio of aluminum nitride contained in the CMC is controllable by adding a predetermined amount of the aluminum nitride particle beforehand in mixed powder. That is, a CMC may be produced, while controlling a volume ratio of aluminum nitride, by adding y-mole of aluminum nitride as is shown in following equation (3). As shown in the following equation (3), specifically, a CMC in which (2+y) moles of aluminum nitride and 1 mole of MeB$_2$ 1 mole coexist may be produced.

[Formula 3]

$$Me+2BN+2Al+yAlN \rightarrow (2+y)AlN+MeB_2 \quad (3)$$

(where, Me is metal powder)

Mixed powder is introduced into an jig or the like to obtain a desired form after it was agitated for a predetermined period and mixed. Then, porosity of a green compact obtained is controllable by adjusting a pressure given to this mixed powder.

Then, when organic solvent is used, degreasing is performed, and when not used, a green compact is obtained as it is. A precise porosity of the green compact is calculable from a size (volume) and a mass of the green compact obtained.

Solid Al of predetermined amount is placed on the obtained green compact, and under inert gas atmosphere, such as Ar, it is heated by 700 to 1400° C., and thus molten Al is infiltrated into the green compact. In addition, molten Al currently prepared beforehand may be infiltrated. Then, after reaction system is maintained for 10 minutes at 1000 to 1400° C., it is annealed, and in this way a CMC having aluminum nitride as a matrix may be produced. In addition, as inert gas used when molten Al is infiltrated, Ar or N$_2$ gas may be mentioned, but N$_2$ gas shows a strong reactivity to molten Al as in a case of direct nitriding at the time of the above described aluminum nitride powder synthesis, so that N$_2$ gas may be diluted and (Ar+N$_2$) mixed gas may be used in order to avoid this phenomenon. In addition, NH$_3$ gas may be used instead of N$_2$ gas in the light of nitriding.

Furthermore, also in infiltration of Al, not only pure Al but molten Al containing not more than 3 mass % of Mg may also be used for the purpose of reduction of Al$_2$O$_3$ produced by oxidization of Al. In addition, in order to reduce Al$_2$O$_3$ effectively, it is preferable that no less than 0.5 mass % of Mg is contained.

In each raw materials containing Al remaining in the obtained CMC, a calibration curve is prepared by an XRD analysis using mixed powder of a raw material and a product that were beforehand adjusted to a predetermined mass ratio, an XRD analysis of the specimen in which a matrix composition was varied is carried out and thus an amount of residues (percentage) is calculated based on the calibration curve and from an X-ray intensity of obtained measurement result. Boride, Al, and aluminum nitride are mixed together in mixed powder used here, a volume ratio of Al and aluminum nitride in this mixed powder of Al and aluminum nitride is sequentially varied as 0:10, 1:9, and 2:8. And, a mixture in which a predetermined amount of boron nitride powder is further mixed is used in the above described mixed powder for a CMC containing boron nitride.

Next, description for a fifth embodiment of the present invention will be given. A fifth embodiment of the present invention is a ceramic matrix composite that is produced and obtained by either one method for production of the first and the third embodiment of the present invention that have so far been described, wherein the ceramic matrix composite comprises a metal boride and a matrix having an aluminum nitride with Al content of not more than 20% by volume as a principal component. That is, since it has a low Al content, characteristics of aluminum nitride as a matrix are demonstrated, and it is a composite material having characteristic of demonstrating a high strength and simultaneously a low coefficient of thermal expansion. Specifically, the composite material may have a coefficient of thermal expansion of 10 ppm/K or less. In addition, in order to eliminate influence on physical properties value by inclusion of Al, an Al content is preferably not more than 10% by volume, and thereby a high strength and a low coefficient of thermal expansion are attained better.

Next, description for a sixth embodiment of the present invention will be given. A sixth embodiment of the present invention is a ceramic matrix composite that is produced and obtained by either one method for production of the second and the fourth embodiment of the present invention that have so far been described, wherein the ceramic matrix composite comprises a metal boride and a matrix having an aluminum nitride with Al content of not more than 20% by volume as a principal component. That is, since it has a low Al content, characteristics of aluminum nitride as a matrix are demonstrated, and it is a composite material having characteristic of demonstrating a high strength and simultaneously a low coefficient of thermal expansion. Specifically, the composite material may have a coefficient of thermal expansion of 10 ppm/K or less. In addition, in order to eliminate influence on physical properties value by inclusion of Al, Al content is preferably not more than 10% by volume, and thereby a high strength and a low coefficient of thermal expansion are attained better.

EXAMPLE

Hereinafter, illustrative operation result of the present invention will be described.

Example 1

Figure 1:
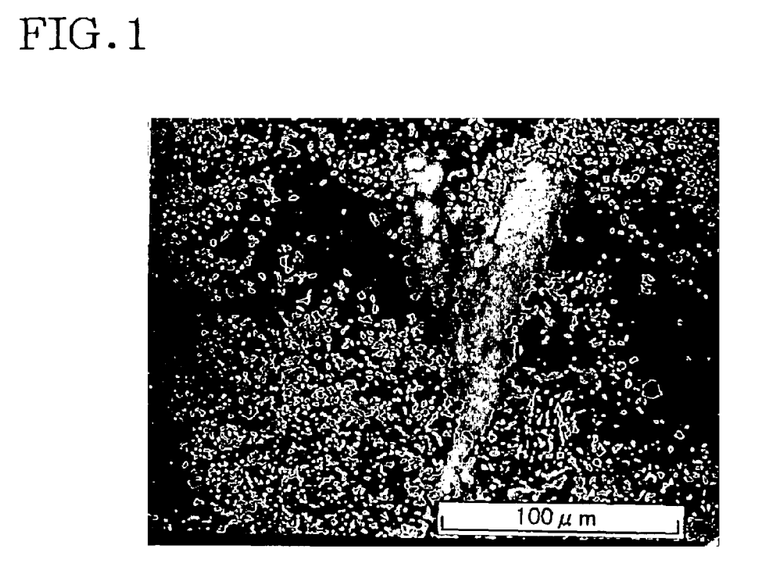
FIG. 1 is a photograph by a scanning electron microscope in which a micro structure of a composite material produced in Example 1 is shown.

A Ti powder having a mean particle diameter of not more than 44 μm, and boron nitride powder having a mean particle diameter of 10 μm were mixed so that it might give 1:2 by molar ratio. A predetermined jig was filled up with the obtained mixed powder, and the mixed powder was compacted that porosity of green compact obtained might give 38.0%. On the obtained green compact, equal moles of Al (commercially available pure Al (A1050, purity >99.5%)) as boron nitride powder was placed, under Ar gas atmosphere, it was heated to 1200° C. and infiltration of Al was carried out, and subsequently after being maintained at this temperature for 60 minutes, it was annealed and a composite material was produced (Example 1). And, a scanning electron microscope photograph of a micro structure of the composite material produced in Example 1 is shown in FIG. 1.

Comparative Examples 1 to 3

Figure 3:
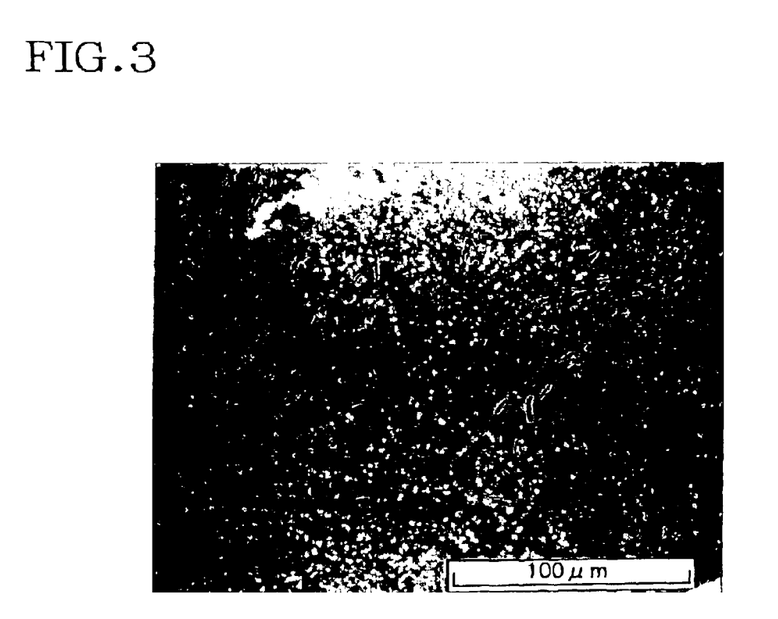
FIG. 3 is a photograph by a scanning electron microscope in which a micro structure of a composite material produced in Comparative Example 1 is shown.

Except setting porosity of green compact to 87, 78, and 65%, same operation as in the above described Example 1 was repeated, and composite materials were produced (Comparative Examples 1 to 3). And, scanning electron microscope photographs of micro structure of composite materials produced in Comparative Example 1 is shown in FIG. 3.

Example 2

Figure 2A:
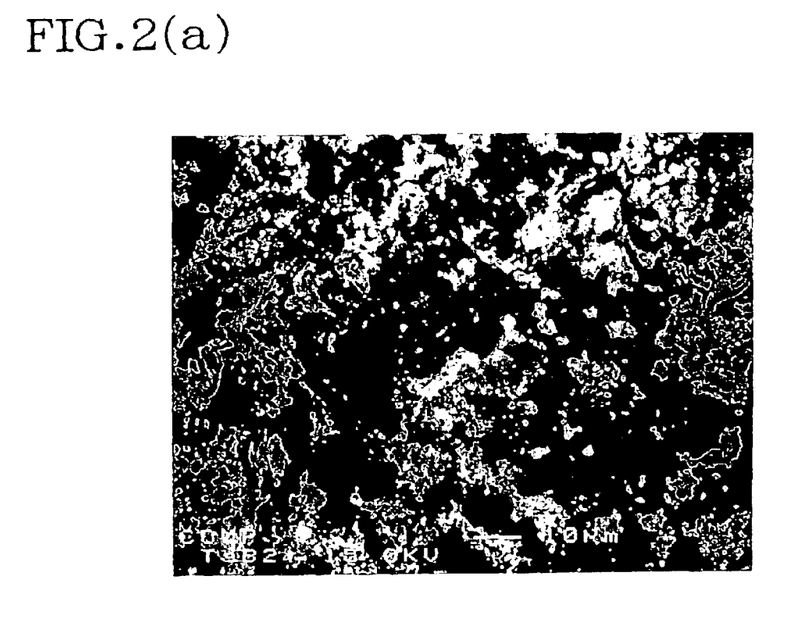
FIGS. 2(a)(b) are photographs by a scanning electron microscope in which a micro structure of a composite material produced in Example 2 is shown.
Figure 2B:
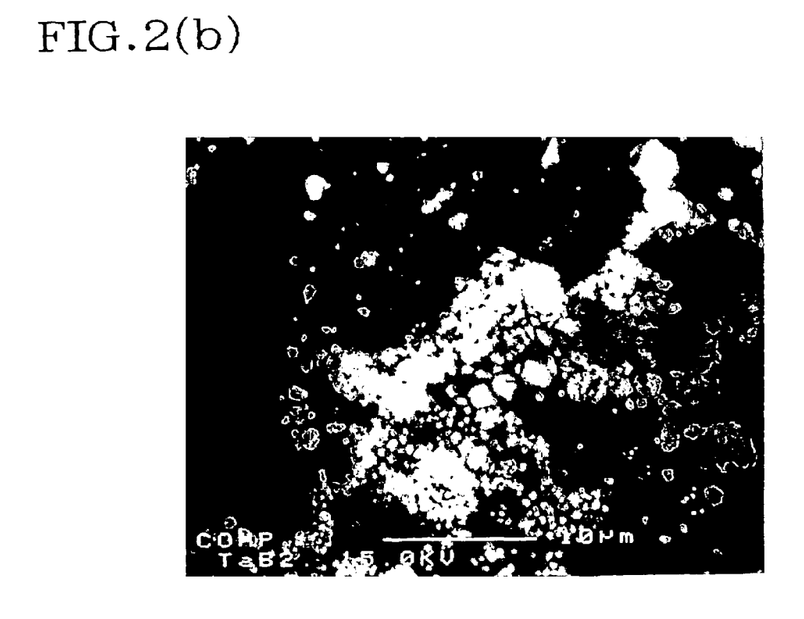
FIG. 2(b) is a partially enlarged photograph of FIG. 2(a).
Figure 4A:
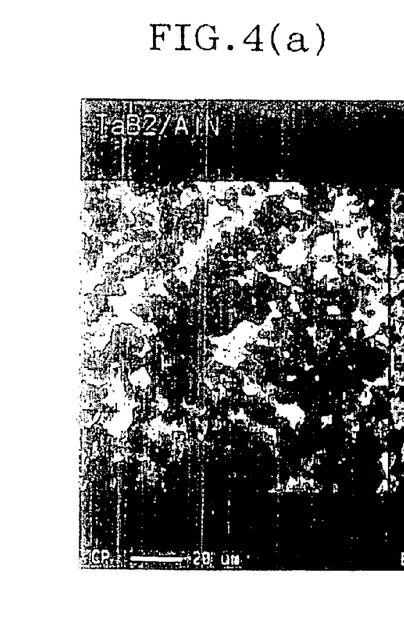
Figure 4B:
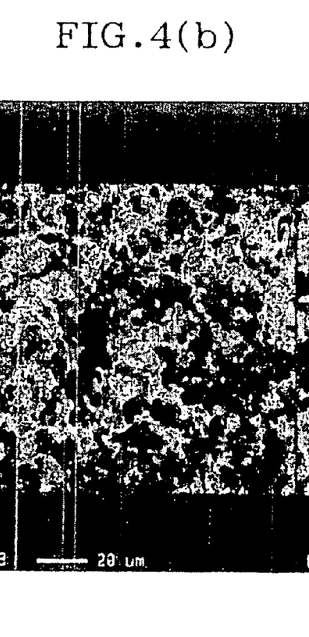
FIG. 4(b) shows distribution of boron (B)
Figure 4C:
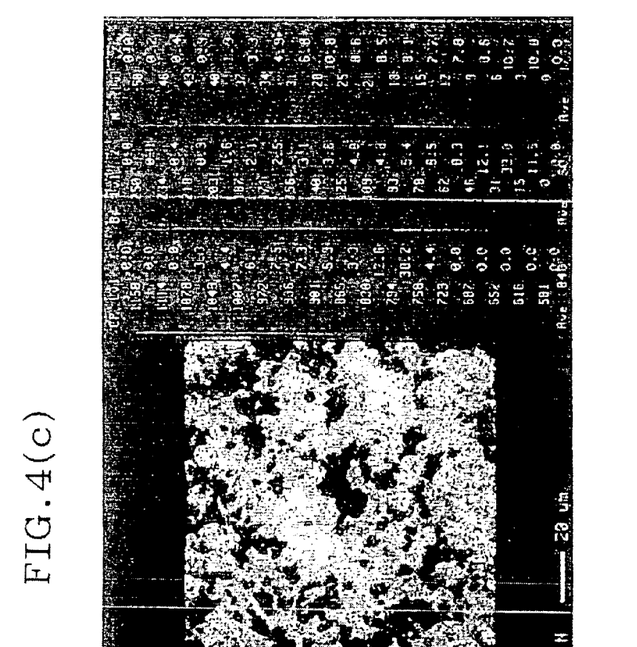
FIG. 4(c) shows distribution of nitrogen (N).
Figure 5A:
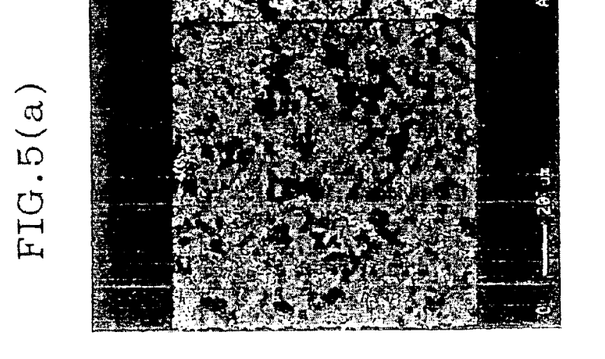
Figure 5B:
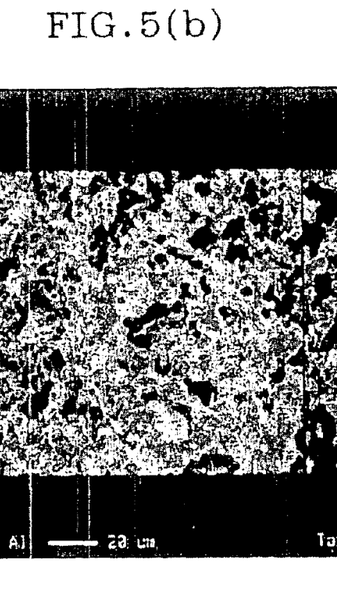
Figure 5C:
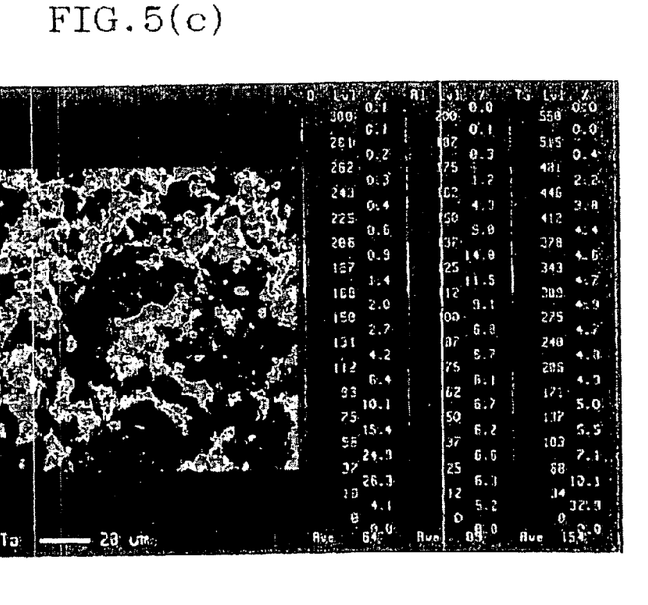

Except for using Ta powder having a mean particle diameter not more than 44 μm instead of Ti powder, and setting porosity of a green compact to 37.8%, a same operation as the above described Example 1 was repeated, and a composite material was produced (Example 2). A scanning electron microscope photograph of a micro structure of the composite material produced in Example 2 is shown in FIG. 2. In addition, FIG. 2(b) is a partially enlarged photograph of FIG. 2(a). Besides, FIG. 4 is a photograph showing a half tone picture displaying an element mapping on a display by EPMA of the composite material produced in Example 2, and (a) is a non-processed photograph, and (b) shows a distribution of boron (B), and (c) of nitrogen (N). Similarly, FIG. 5 is a photograph showing a half tone picture displaying an element mapping on a display by EPMA of the composite material obtained in Example 2, and (a) is a photograph showing a distribution of oxygen (O), and (b) of aluminum (Al), and (c) of tantalum (Ta).

Example 3

Except for not giving maintaining time after molten Al infiltration, a same operation as on Example 1 was repeated, and a composite material was produced (Example 3).

Example 4

Except for not giving maintaining time after molten Al infiltration, a same operation as in Example 2 was repeated, and a composite material was produced (Example 4).

Example 5

Figure 6:
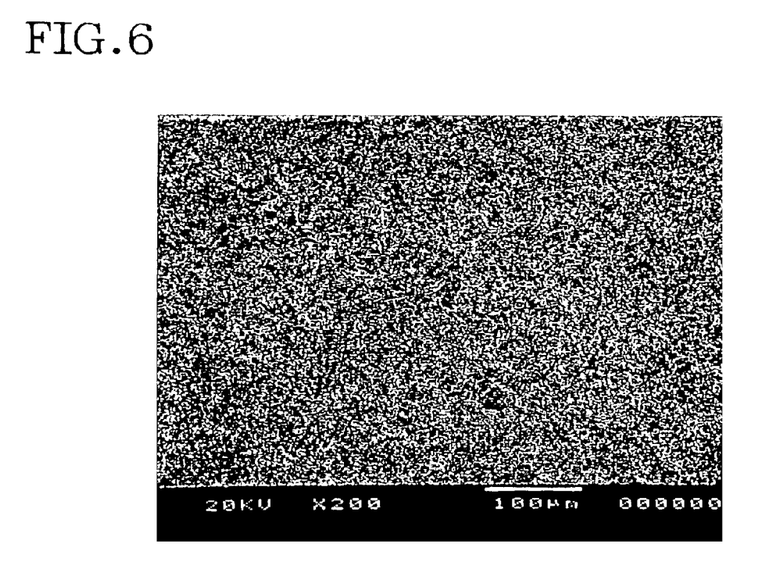
FIG. 6 is a photograph of a scanning electron microscope (magnification x200) in which a micro structure of a composite material produced in Example 5 is shown.
Figure 7:
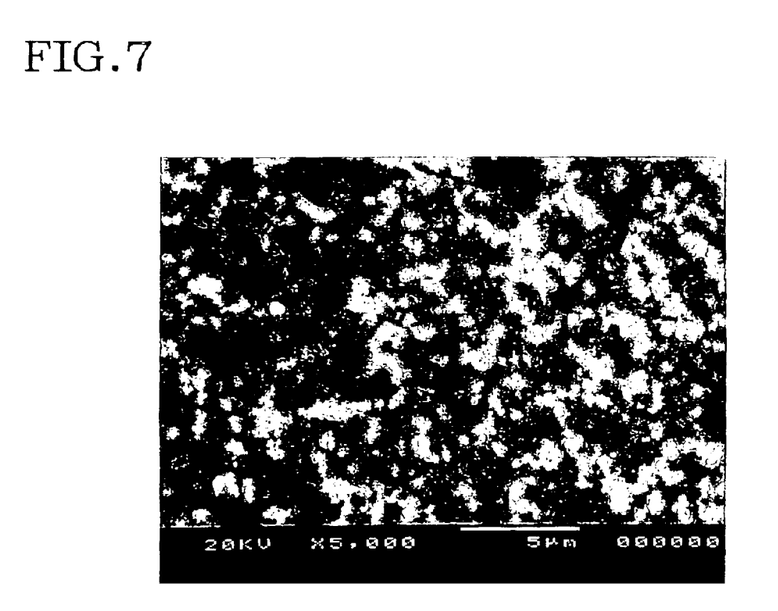
FIG. 7 is a photograph of scanning electron microscope (magnification x5000) in which a micro structure of a composite material produced in Example 5 is shown.

Except for using boron nitride powder having a mean particle diameter of 1 μm, a same operation as in Example 1 was repeated, and a composite material was produced (Example 5). Besides, scanning electron microscope photographs (magnification ×200, ×5000) of micro structure of composite material produced in Example 5 are shown in FIGS. 6 and 7.

Examples 6 and 7

A Ti powder having a mean particle diameter of not more than 44 μm, and boron nitride powder having a mean particle diameter of 10 μm were prepared and mixed so that it might give a ratio of 1: (2+x) by molar ratio (where, x represents 0.20 or 0.41). A predetermined jig was filled up with the obtained mixed powder, and the mixed powder was compacted, so that 36.5% of porosity might be given in case of x=0.20, and 35.0% of porosity might be given in case of x=0.41 to give green compact. On these green compact, Al (commercially available pure Al (Al050, purity >99.5%)) of two times mole of the metal powder was placed, under Ar gas atmosphere, it was heated to 1200° C. and infiltration of Al was carried out, and subsequently after being maintained at this temperature for 60 minutes, it was annealed and composite materials were produced (Examples 6 and 7). Consequently, in Examples 6 and 7, a CMC comprising phases of AlN, $TiB_2$, and BN was produced.

Examples 8 and 9

A Ta powder having a mean particle diameter of not more than 44 μm, and boron nitride powder having a mean particle diameter of 10 μm were prepared and mixed so that it might give a ratio of 1:(2+x) by molar ratio (where, x represents 0.21 or 0.98). A predetermined jig was filled up with the obtained mixed powder, and the mixed powder was compacted, so that 36.2% of porosity might be given in case of x=0.21, and 31.4% of porosity might be given in case of x=0.98 to give green compact. On these green compact, Al (commercially available pure Al (Al050, purity >99.5%)) of two times mole of the metal powder was placed, under Ar gas atmosphere, it was heated to 1200° C. and infiltration of Al was carried out, and subsequently after being maintained at this temperature for 60 minutes, it was annealed and composite materials were produced (Examples 8 and 9). Consequently, in Examples 8 and 9, a CMC consisting of about 55% by volume, about 40% by volume, and about 5% by volume of phases of AlN, $TaB_2$, and BN, respectively, was produced, and moreover in Example 9, a CMC comprising phases of AlN, $TaB_2$, and BN was produced.

Examples 10 and 11

To a Ti powder having a mean particle diameter of not more than 44 μm, and boron nitride powder having a mean particle diameter of 1 μm, an aluminum nitride powder having a mean particle diameter of 1.2 μm was prepared and mixed so that a mixing ratio of (Ti powder):(boron nitride powder):(aluminum nitride powder)=1:2:y (y is 0.10 or 0.36) by mole. A predetermined jig was filled up with the obtained mixed powder, and the mixed powder was compacted, so that 37.1% of porosity might be given in case of y=0.10, and 35.0% of porosity might be given in case of y=0.36 to give green compact. On these green compact, Al (commercially available pure Al (Al050, purity >99.5%)) of two times mole of the metal powder was placed, under Ar gas atmosphere, it was heated to 1200° C. and infiltration of Al was carried out, and subsequently after being maintained at this temperature for 60 minutes, it was annealed and composite materials were produced (Examples 10 and 11). Consequently, in Example 10, a CMC comprising about 64% by volume of aluminum nitride was able to be produced, and in Example 11, a CMC comprising about 70% by volume of aluminum nitride was able to be produced. Therefore, it became clear that control of a volume ratio of aluminum nitride used as matrix was possible by containing aluminum nitride powder of a predetermined amount in mixed powder used as raw material beforehand.

Examples 12 and 13

To a Ta powder having a mean particle diameter of not more than 44 μm, and boron nitride powder having a mean particle diameter of 10 μm an aluminum nitride powder having a mean particle diameter of 1.2 μm was prepared and mixed so that a mixing ratio of (Ta powder):(boron nitride powder):(aluminum nitride powder)=1:2:y (y is 0.11 or 0.38) by molar ratio. A predetermined jig was filled up with the obtained mixed powder, and the mixed powder was compacted, so that 36.9% of porosity might be given in case of y=0.11, and 34.7% of porosity might be given in case of y=0.38 to give green compact. On these green compact, Al (commercially available pure Al (Al050, purity >99.5%)) of two times mole of the metal powder was placed, under Ar gas atmosphere, it was heated to 1200° C. and infiltration of Al was carried out, and subsequently after being maintained at this temperature for 60 minutes, it was annealed and composite materials were produced (Examples 12 and 13). Consequently, in Example 12, a CMC comprising about 60% by volume of aluminum nitride was able to be produced, and in Example 13, a CMC comprising about 66% by volume of aluminum nitride was able to be produced. Therefore, it became clear that control of a volume ratio of aluminum nitride used as matrix was possible by containing aluminum nitride powder of a predetermined amount in mixed powder used as raw material beforehand.

Example 14

Except for setting porosity of a green compact to 25.0%, a same operation as in Example 5 was repeated, and a composite material was produced (Example 14).

Example 15

Except for setting porosity of a green compact to 25.0%, a same operation as in Example 2 was repeated, and a composite material was produced (Example 15).

Example 16

Except for setting porosity of a green compact to 21.0%, a same operation as in Example 6 was repeated, and a composite material was produced (Example 16).

Example 17

Except for setting porosity of a green compact to 21.0%, a same operation as in Example 8 was repeated, and a composite material was produced (Example 17).

Example 18

Except for setting porosity of a green compact to 21.0%, a same operation as in Example 10 was repeated, and a composite material was produced (Example 18).

Example 19

Except for setting porosity of a green compact to 21.0%, a same operation as in Example 12 was repeated, and a composite material was produced (Example 19).

Example 20

Except for using A5052 alloy (Al+2.5 mass % of Mg) as a molten Al used for infiltration, a same operation as in Example 5 was repeated, and a composite material was produced (Example 20).

Example 21

Except for using a mixed gas of Ar and $N_2$ gas (Ar:$N_2$=1:1 (volume ratio)), a same operation as in Example 20 was repeated, and a composite material was produced (Example 21).

Comparative Examples 4 and 5

Except for setting porosity of green compact to 72% and 58%, a same operation as in Example 5 was repeated, and composite materials were produced (Examples 4 and 5).

Comparative Examples 6 and 7

Except for setting porosity of green compact to 74% and 60%, a same operation as in Example 2 was repeated, and composite materials were produced (Examples 4 and 5).

(XRD Analysis)

XRD analysis of composite materials produced in Examples 2, 5 to 21 and Comparative Examples 4 to 7 was performed.

(Measurement of Physical Characteristics)

Specimens were cut out from the above described composite materials produced in Examples 2, 5 to 21 and Comparative Examples 4 to 7. A coefficient of thermal expansion and Young's modulus were measured in order to confirm a degree of progress of a displacement reaction of Al in matrix to aluminum nitride. In addition, various measuring methods are shown below. Measured results are shown in Table 1.

[Measurement of a Coefficient of Thermal Expansion]

Measurement from a room temperature to a predetermined temperature was performed in Ar gas atmosphere, using a thermal expansion meter (manufactured by Mac Science Co., Ltd.: TD-5000S).

[Measurement of a Young's Modulus]

From obtained composite materials, specimens of a predetermined form were cut, strength in four-point bending test at room temperature was carried out according to JIS R1601, and Young's modulus was measured.

TABLE 1

| | Material composition | BN particle diameter ($\mu$m) | Molten Al | BN excessive amount[*1] (mole) | AlN excessive amount[*2] (mole) | Molten Al Infiltration atmosphere | Porosity Of green Compact (%) | Coefficient of thermal expansion((ppm/K) |
|---|---|---|---|---|---|---|---|---|
| Example 5 | $TiB_2$/AlN | 1 | A1050 | — | — | Ar | 38.0 | 8.6 |
| Example 2 | $TaB_2$/AlN | 10 | A1050 | — | — | Ar | 37.8 | 8.8 |
| Example 14 | $TiB_2$/AlN | 1 | A1050 | — | — | Ar | 25.0 | 7.9 |
| Example 15 | $TaB_2$/AlN | 10 | A1050 | — | — | Ar | 25.0 | 8.1 |
| Example 6 | $TiB_2$+BN/AlN | 1 | A1050 | 0.20 | — | Ar | 36.5 | 7.5 |
| Example 7 | $TiB_2$+BN/AlN | 1 | A1050 | 0.41 | — | Ar | 35.0 | 6.9 |
| Example 16 | $TiB_2$+BN/AlN | 1 | A1050 | 0.20 | — | Ar | 21.0 | 7.2 |
| Example 8 | $TaB_2$+BN/AlN | 10 | A1050 | 0.21 | — | Ar | 36.2 | 7.8 |
| Example 9 | $TaB_2$+BN/AlN | 10 | A1050 | 0.98 | — | Ar | 31.4 | 7.4 |
| Example 17 | $TaB_2$+BN/AlN | 10 | A1050 | 0.21 | — | Ar | 21.0 | 7.2 |
| Example 10 | $TiB_2$/AlN | 1 | A1050 | — | 0.10 | Ar | 37.1 | 7.8 |
| Example 11 | $TiB_2$/AlN | 1 | A1050 | — | 0.36 | Ar | 35.0 | 7.4 |
| Example 18 | $TiB_2$/AlN | 1 | A1050 | — | 0.1 | Ar | 21.0 | — |
| Example 12 | $TaB_2$/AlN | 10 | A1050 | — | 0.11 | Ar | 36.9 | 7.9 |
| Example 13 | $TaB_2$/AlN | 10 | A1050 | — | 0.38 | Ar | 34.7 | 7.4 |
| Example 19 | $TaB_2$/AlN | 10 | A1050 | — | 0.11 | Ar | 21.0 | 7.2 |
| Example 20 | $TiB_2$/AlN | 1 | A5052 | — | — | Ar | 38.0 | — |
| Example 21 | $TiB_2$/AlN | 1 | A5052 | — | — | Ar+N2 | 38.0 | — |
| Comparative Example 4 | $TiB_2$/AlN | 1 | A1050 | — | — | Ar | 72.0 | 13.8 |
| Comparative Example 5 | $TiB_2$/AlN | 1 | A1050 | — | — | Ar | 58.0 | 12.3 |
| Comparative Example 6 | $TaB_2$/AlN | 10 | A1050 | — | — | Ar | 74.0 | 14.4 |
| Comparative Example 7 | $TaB_2$/AlN | 10 | A1050 | — | — | Ar | 60.0 | 12.4 |

[*1] Value of x represented by following equation (1) $Me + (2 + x)BN + 2Al \rightarrow 2AlN + MeB_2 + xBN$ ... Equation (1)
[*2] Value of y represented by following equation (2) $Me + 2BN + 2Al \rightarrow yAlN + (2 + y)AlN + MeB_2$ ... Equation (2)

(Evaluation)

Measured results confirmed that in composite materials produced in Comparative Examples 1 to 3, much amount of Al remained as compared with a composite material produced in Example 1 shown in FIG. 1. This is probably because since porosity of the green compact in Example 1 was controlled within a range of a predetermined numerical value, a reaction advanced in proper quantities and an amount of residual Al in the matrix was controlled. And, as is shown in FIGS. 2(a)(b), also in Example 2 in which Ta was used as metal powder, a composite material with controlled Al residual percentage could be obtained.

Furthermore, obtained photographs shown in FIGS. 4(a)(b)(c) and FIGS. 5(a)(b)(c) confirmed that in obtained composite materials, segregation has arisen in combination of elements of Ta and B (FIG. 5(c) and FIG. 4(b)), and of Al and N (FIG. 5(b) and FIG. 4(c)), that is, $TaB_2$ and aluminum nitride were formed and distributed to constitute the composite material. This result confirms effects of a method for production of the present invention. In addition, in original drawings of FIGS. 4(a)(b)(c) and FIGS. 5(a)(b)(c), coloring is given according to an amount of existence of each element (%) changing as reddish—yellowish—greenish—bluish, from small amount to much amount, to express each element's existence distribution more clearly.

In addition, a comparison in XRD analysis results of composite materials produced in Example 3 and Example 4 proved that in the case where Ta was used as metal powder, even if maintenance of an elevated temperature after molten Al infiltration was not carried out, an in-situ reaction was completed. And when Ti was used, in order to control residue of the raw material, it became clear that maintenance of an elevated temperature after Al infiltration was preferable.

And in Examples 1 to 3 and Comparative Examples 1 to 3 in which 10-$\mu$m boron nitride powder was used, $Al_3Ti$ intermetallic compound was formed in a stage immediately after production, and subsequently decomposition of $Al_3Ti$ was promoted by elevated temperature maintained, but on the contrary in Example 5 in which 1-$\mu$m boron nitride powder was used, it became clear that $Al_3Ti$ was not formed in a stage immediately after production but all of Ti used was spent in formation of $TiB_2$. For this reason, in photograph shown in FIG. 1, massive $Al_3Ti$ phase (white portion in center of the photograph) could be confirmed, whereas $Al_3Ti$ phase could not be confirmed in photographs shown in FIGS. 6 and 7. This is probably because that since a mean particle diameter (1 $\mu$m) of the boron nitride powder used in Example 5 was small as compared with a mean particle diameter (10 $\mu$m) of the boron nitride powder used in Example 1 (FIG. 1), a number of nuclei used as nitriding point increased, therefore Ti element was spent in formation of fine $TiB_2$ particle phase (white portion) of about 1 $\mu$m (mean particle diameter) observed in photograph of FIG. 7, and contribution to formation of $Al_3Ti$ phase became difficult.

And, in a composite material produced in Example 10, as compared with a composite material produced in Example 1, an amount of residual Al was reduced and percentage of nitriding of a matrix was increased. This result showed clearly that it was possible to make percentage of nitriding of a matrix formed increased by addition of aluminum nitride powder.

Material characteristics results of Table 1 show that porosity of green compact is greatly shifted from a stoichiometric composition in specimens of Comparative Examples 4 to 7 as compared with results of Examples, a large amount of residual Al existed in the matrix, and therefore physical property values similar to an MMC having Al as a matrix rather than to a CMC were given. Since a volume ratio of residual Al phase with large thermal expansion became larger in the matrix, a coefficient of thermal expansion of these specimens showed a value of no less than 10 ppm/K, while the specimens of Examples showed values of 10 ppm/K or less, thereby reduction in coefficient of thermal expansion was confirmed. Further, a coefficient of thermal expansion of composite materials obtained in the present invention suggested the reduction in volume of residual Al even in comparison with a value expected from composite rules for mixing. Moreover, as a result of measurement for Young's modulus, specimens of Comparative Examples 4–7 showed physical property values similar to an MMC, while specimens of Examples had displacement reaction advanced until matrix had a composition similar to ceramic, thereby increase in the values was confirmed. For this reason, the above described results could confirm effects in case of porosity of green compact being controlled, and of boron nitride and aluminum nitride particle being superfluously added.

As is described above, according to a method of producing a ceramic matrix composite of the present invention, it is possible that a green compact is formed to give porosity of the green compact having a porous structure comprising mixed powder containing predetermined materials being in a range of a predetermined numerical value, and molten Al is infiltrated thereto to reduce a residual percentage of Al in a matrix, and thereby a ceramic matrix composite having desired physical characteristics may be produced. And, reduction of a residual percentage of Al is possible also by specifying an amount of metal powder to be used. Furthermore, since a composite material having ceramic matrix may be produced with little energy consumption compared with methods for production of conventional composite materials, reduction of manufacturing cost and a near net shaping in consideration of forms of a final product may be enabled. The present method is employable suitably also for industrial production process.

And, since a ceramic matrix composite of the present invention is produced by the above described method of producing a ceramic matrix composite and has Al content not more than a predetermined numerical value, it has characteristics of having a low coefficient of thermal expansion and a high strength while characteristics of aluminum nitride as matrix are demonstrated.

What is claimed is:

1. A method of producing a ceramic matrix composite comprising the steps of:

filling mixed powder obtained by mixing metal powder and boron nitride powder into a predetermined container to form a green compact having a porous structure; and infiltrating the green compact with molten Al to form a composite material containing metal boride and having aluminum nitride as a matrix, wherein the green compact is formed by compressing the mixed powder whose mixing ratio of the metal powder to the boron nitride powder is 1:1.8 to 1:2.2 (molar ratio) so that porosity of the green compact is 34 to 42%.

2. A method of producing a ceramic matrix composite comprising the steps of:

filling mixed powder obtained by mixing metal powder and boron nitride powder into a predetermined container to form a green compact having a porous structure; and infiltrating the green compact with molten Al to form a composite material containing metal boride and having aluminum nitride as a matrix, wherein the green compact is formed by compressing the mixed powder whose mixing ratio of the metal powder to the boron nitride powder is 1:2.2 to 1:4.0 (molar ratio) so that porosity of the green compact is 26 to 40%.

3. A method of producing a ceramic matrix composite comprising the steps of:
filling mixed powder obtained by mixing metal powder and boron nitride powder into a predetermined container to form a green compact having a porous structure; and
infiltrating the green compact with molten Al to form a composite material containing metal boride and having aluminum nitride as a matrix, wherein the green compact is formed by compressing the mixed powder whose mixing ratio of the metal powder to the boron nitride powder is 1:1.8 to 1:2.2 (molar ratio) is compressed so that porosity of the green compact is 15 to 34%.

4. A method of producing a ceramic matrix composite comprising the steps of:
filling mixed powder obtained by mixing metal powder and boron nitride powder into a predetermined container to form a green compact having a porous structure; and
infiltrating the green compact with molten Al to form a composite material containing metal boride and having aluminum nitride as a matrix, wherein the green compact is formed by compressing the mixed powder whose mixing ratio of the metal powder to the boron nitride powder is 1:2.2 to 1:4.0 (molar ratio) is compressed to form the green compact so that porosity of the green compact is 15 to 26%.

5. The method of producing a ceramic matrix composite according to claim 1, wherein the mixed powder further contains aluminum nitride particles in a ratio of not more than 1 mole to 1 mole of the metal powder in addition to the metal powder and the boron nitride powder.

6. The method of producing a ceramic matrix composite according to claim 2, wherein the mixed powder further contains aluminum nitride particles in a ratio of not more than 1 mole to 1 mole of the metal powder in addition to the metal powder and the boron nitride powder.

7. The method of producing a ceramic matrix composite according to claim 3, wherein the mixed powder further contains aluminum nitride particles in a ratio of not more than 1 mole to 1 mole of the metal powder in addition to the metal powder and the boron nitride powder.

8. The method of producing a ceramic matrix composite according to claim 4, wherein the mixed powder further contains aluminum nitride particles in a ratio of not more than 1 mole to 1 mole of the metal powder in addition to the metal powder and the boron nitride powder.

9. The method of producing a ceramic matrix composite according to claim 1, wherein a mean particle diameter of the boron nitride powder is not more than 20 $\mu$m.

10. The method of producing a ceramic matrix composite according to claim 1, wherein the green compact is maintained at 1000 to 1400° C. for no less than 10 minutes after infiltration with molten Al.

11. The method of producing a ceramic matrix composite according to claim 1, wherein at least one kind of the metal powder selected from the group consisting of Ti, Ta, Hf, Nb, and Zr is used.

12. The method of producing a ceramic matrix composite according to claim 1, wherein infiltration with molten Al is carried out under inert gas atmosphere.

13. The method of producing a ceramic matrix composite according to claim 1, wherein the molten Al contains not more than 3% by mass of Mg.

14. A ceramic matrix composite obtained by the steps of:
filling mixed powder obtained by mixing metal powder and boron nitride powder into a predetermined container to form a green compact having a porous structure; and infiltrating the green compact with molten Al to form a composite material containing metal boride and having aluminum nitride as a matrix, wherein the green compact is formed by compressing the mixed powder whose mixing ratio of the metal powder to the boron nitride powder is 1:1.8 to 1:2.2 (molar ratio) so that porosity of the green compact is 34 to 42%,
the ceramic matrix composite comprising metal boride, and a matrix having as a principal component aluminum nitride whose Al content is not more than 20% by volume.

15. A ceramic matrix composite obtained by the steps of:
filling mixed powder obtained by mixing metal powder and boron nitride powder into a predetermined container to form a green compact having a porous structure; and infiltrating the green compact with molten Al to form a composite material containing metal boride and having aluminum nitride as a matrix, wherein the green compact is formed by compressing the mixed powder whose mixing ratio of the metal powder to the boron nitride powder is 1:1.8 to 1:2.2 (molar ratio) so that porosity of the green compact is 15 to 34%,
the ceramic matrix composite comprising metal boride, and a matrix having as a principal component aluminum nitride whose Al content is not more than 20% by volume.

16. The ceramic matrix composite according to claim 14, wherein the Al content is not more than 10% by volume.

17. The ceramic matrix composite according to claim 15, wherein the Al content is not more than 10% by volume.

18. A ceramic matrix composite obtained by the steps of:
filling mixed powder obtained by mixing metal powder and boron nitride powder into a predetermined container to form a green compact having a porous structure; and infiltrating the green compact with molten Al to form a composite material containing metal boride and having aluminum nitride as a matrix, wherein the green compact is formed by compressing the mixed powder whose mixing ratio of the metal powder to the boron nitride powder is 1:2.2 to 1:4.0 (molar ratio) so that porosity of the green compact is 26 to 40%,
the ceramic matrix composite comprising metal boride, boron nitride, and a matrix having as a principal component aluminum nitride whose Al content is not more than 20% by volume.

19. A ceramic matrix composite obtained by the steps of:
filling mixed powder obtained by mixing metal powder and boron nitride powder into a predetermined container to form a green compact having a porous structure; and infiltrating the green compact with molten Al to form a composite material containing metal boride and having aluminum nitride as a matrix, wherein the green compact is formed by compressing the mixed powder whose mixing ratio of the metal powder to the boron nitride powder is 1:2.2 to 1:4.0 (molar ratio) so that porosity of the green compact is 15 to 26%,
the ceramic matrix composite comprising metal boride, boron nitride, and a matrix having as a principal component aluminum nitride whose Al content is not more than 20% by volume.

20. The ceramic matrix composite according to claim 18, wherein the Al content is not more than 10% by volume.

21. The ceramic matrix composite according to claim 19, wherein the Al content is not more than 10% by volume.

22. The ceramic matrix composite according to claim 14, wherein the ceramic matrix composite has a thermal expansion coefficient of 10 ppm/K or less.

23. The ceramic matrix composite according to claim 18, wherein the ceramic matrix composite has a thermal expansion coefficient of 10 ppm/K or less.

* * * * *